United States Patent [19]

Brown

[11] Patent Number: 4,993,657
[45] Date of Patent: Feb. 19, 1991

[54] DUAL SPRING RETRACTOR

[75] Inventor: Louis R. Brown, Oxford, Mich.

[73] Assignee: TRW Vehicle Safety Systems Inc., Lyndhurst, Ohio

[21] Appl. No.: 416,533

[22] Filed: Oct. 3, 1989

[51] Int. Cl.$^5$ .................... A67B 35/02; B65H 75/48
[52] U.S. Cl. .................... 242/107; 242/107.4 R
[58] Field of Search .................... 242/107–107.7; 280/802–808; 297/475–480

[56] References Cited

U.S. PATENT DOCUMENTS

| | | |
|---|---|---|
| 4,123,013 | 10/1978 | Bottrill et al. . |
| 4,126,282 | 11/1978 | Morita et al. . |
| 4,162,772 | 7/1979 | Shimogawa et al. . |
| 4,212,435 | 7/1980 | Kawaharazaki . |
| 4,213,580 | 7/1980 | Kawaharazaki et al. . |
| 4,215,830 | 8/1980 | Cunningham . |
| 4,303,208 | 12/1981 | Tanaka . |
| 4,310,128 | 1/1982 | Morita et al. . |
| 4,383,658 | 5/1983 | Morita et al. . |
| 4,564,153 | 1/1986 | Morinaga et al. .......... 242/107 |
| 4,711,408 | 12/1987 | Mori . |
| 4,749,141 | 6/1988 | Young . |
| 4,809,925 | 3/1989 | Takada .......... 242/107 |

OTHER PUBLICATIONS

Kern and Liebers Document, for "Device For the Automatic Rewinding of a Satety Belt", no date known.

Primary Examiner—Stuart S. Levy
Assistant Examiner—Steven M. duBois
Attorney, Agent, or Firm—Tarrolli, Sundheim & Covell

[57] ABSTRACT

A seat belt retractor has a first relatively strong spring and a second relatively weak spring which bias the spool of the retractor on which the seat belt is wound in a belt retraction direction. A mechanism is actuatable to block the bias of the first spring from acting on the seat belt so that only the second spring acts to bias the seat belt in the belt retraction direction. The first spring acts between the retractor frame and a ratchet wheel and the second spring acts between the ratchet wheel and the spool of the retractor. A pawl is movable into a first position to block the ratchet wheel from rotation in the belt retraction direction so that only the second spring acts to bias the seat belt in a belt retraction direction. A cam is rotatable relative to the retractor spool and controls movement of the pawl. A cam driver is rotatable with the spool and carries a deflectable part which engages the cam and rotates the cam in belt withdrawal and belt retraction directions to control the position of the pawl. The cam and pawl have parts which cooperate to block rotation of the cam in the belt retraction direction by the cam driver when the pawl is in its second position. When the cam is blocked from rotation in the belt retraction direction, the deflectable part can deflect and rotate past the cam.

14 Claims, 7 Drawing Sheets

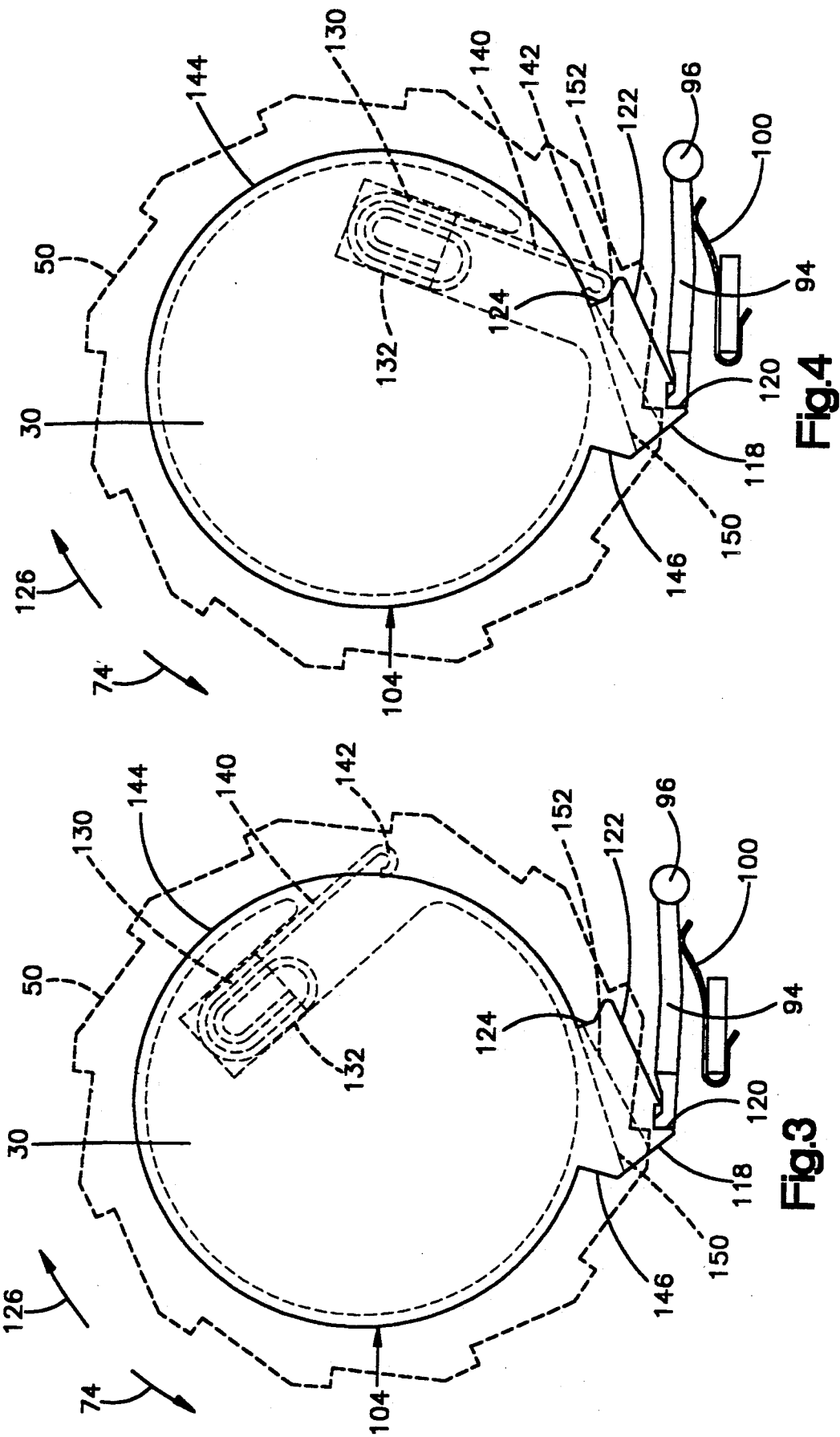

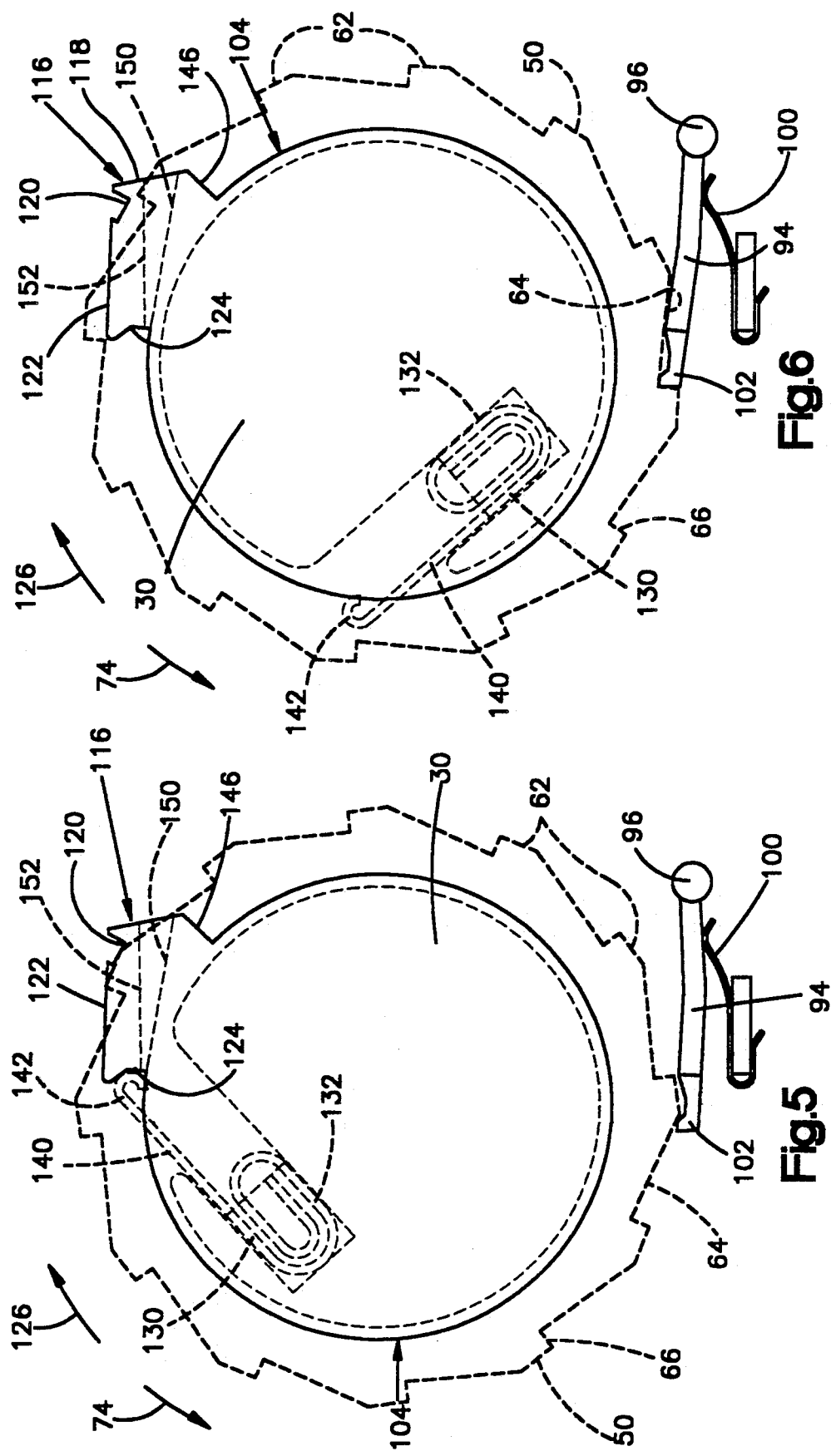

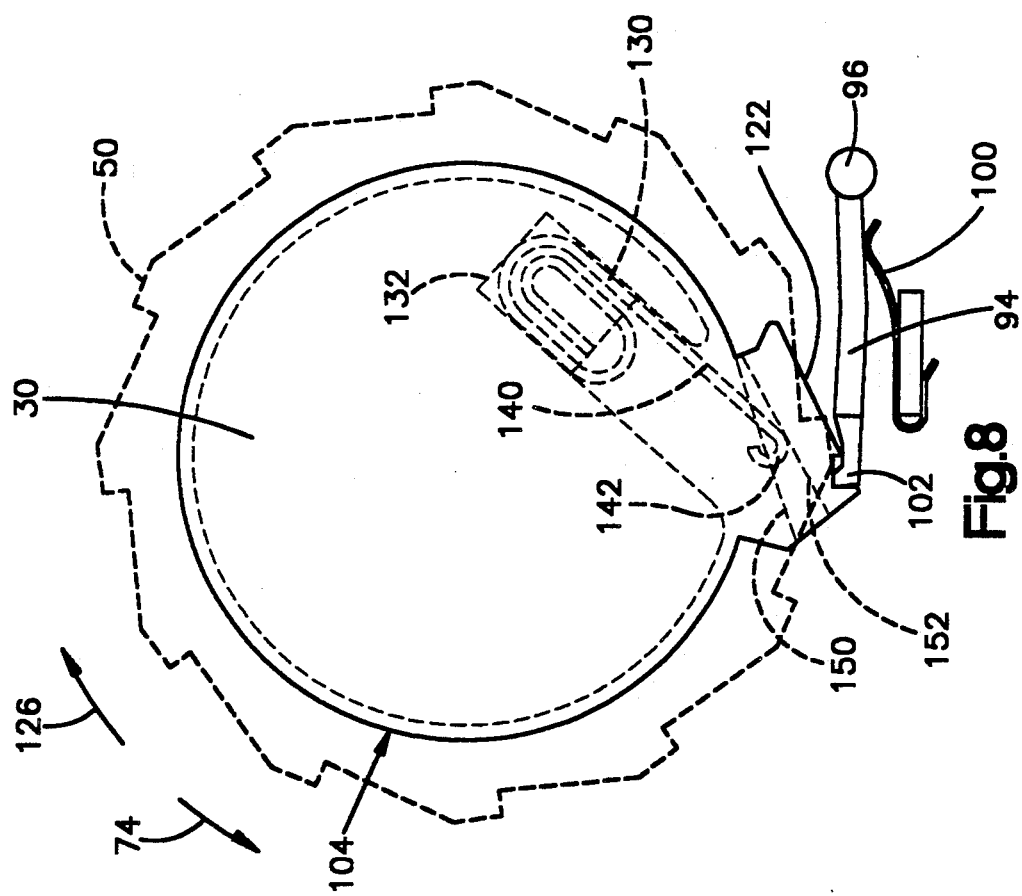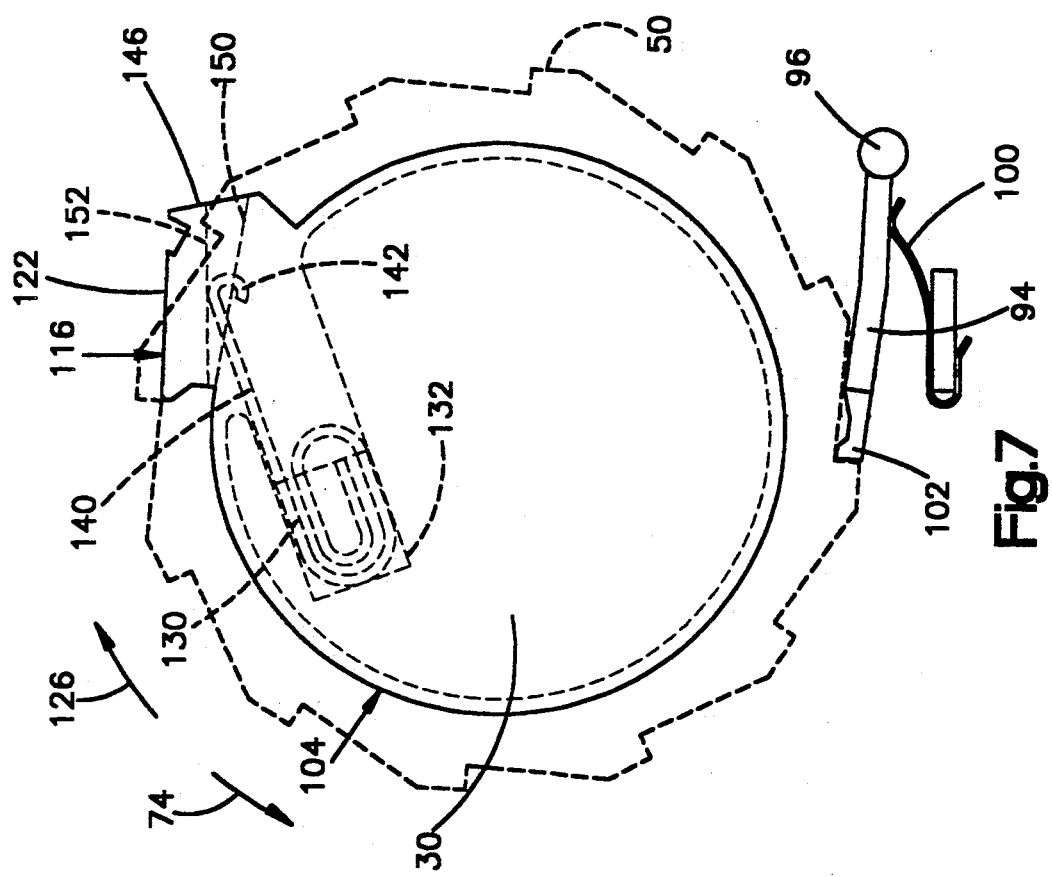

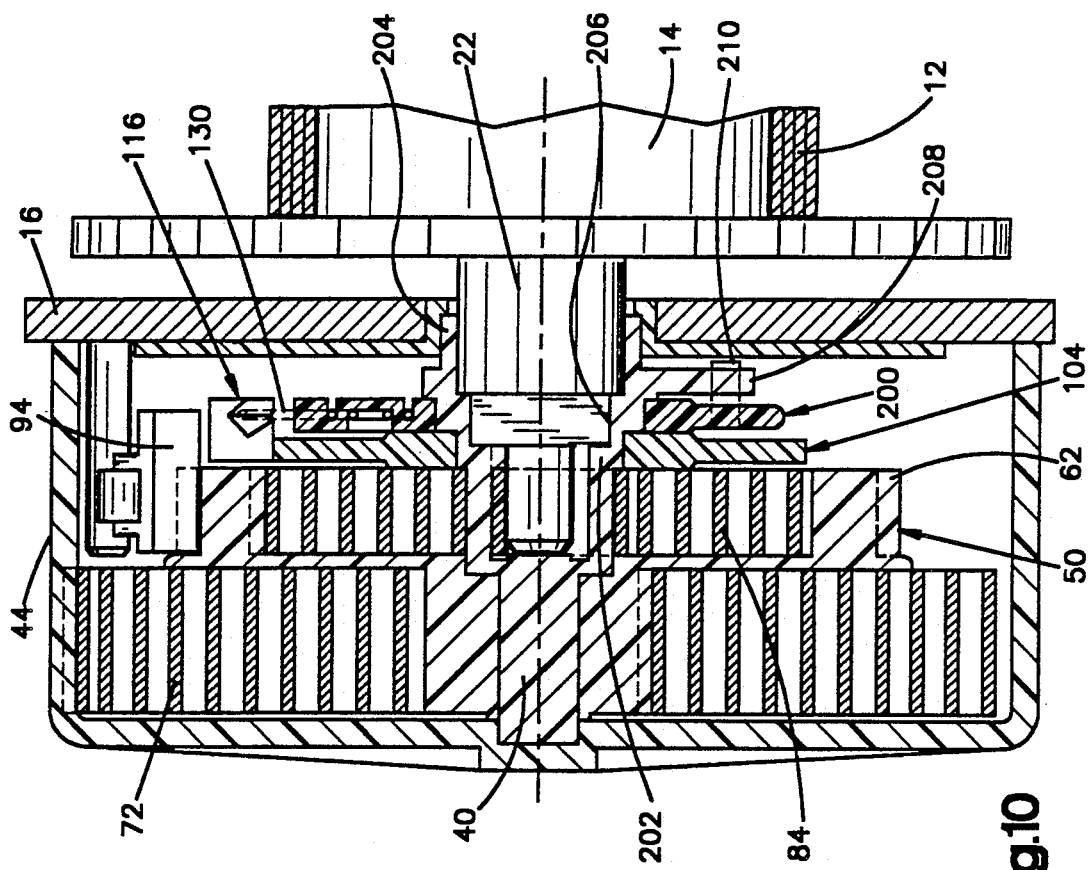
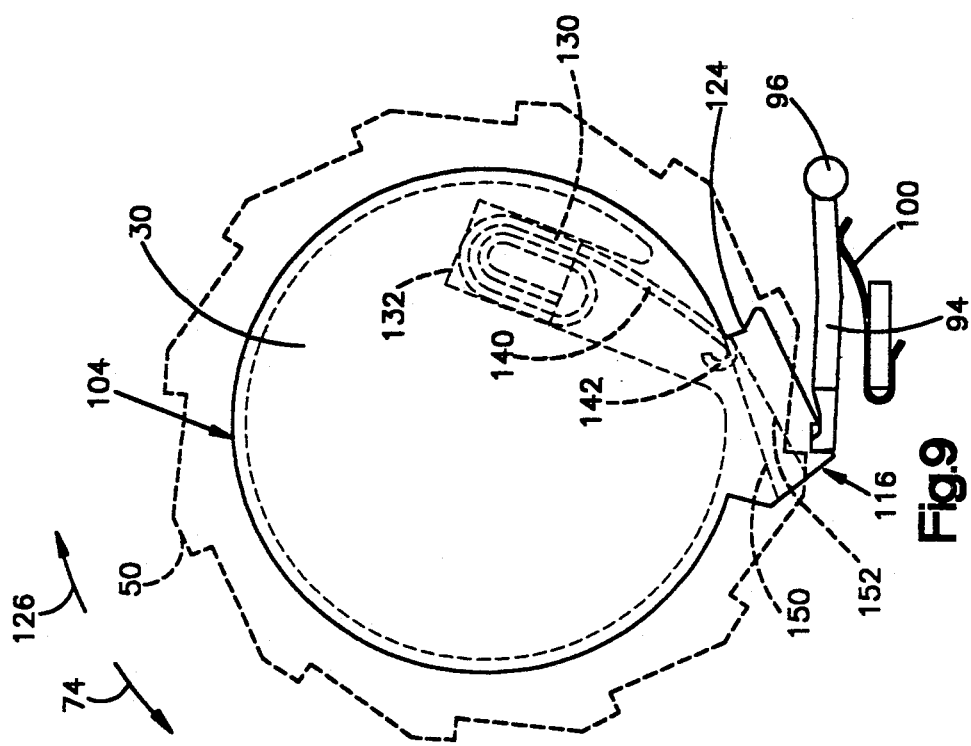

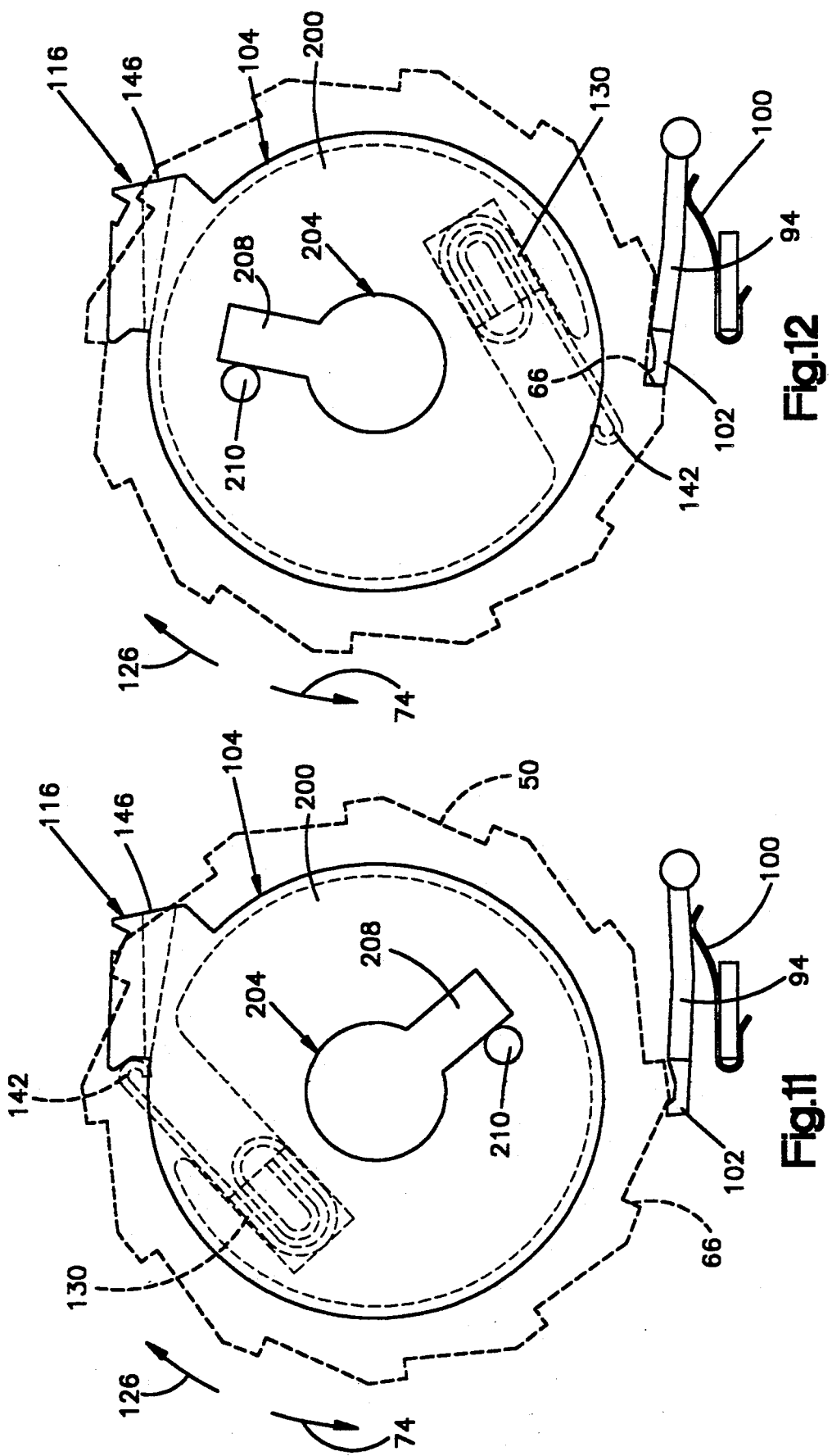

DUAL SPRING RETRACTOR

BACKGROUND OF THE INVENTION

1. Technical Field

The present invention relates to a seat belt retractor for a vehicle. More particularly, the present invention relates to a seat belt retractor having both a relatively strong power spring and a relatively weak comfort spring for biasing the seat belt in a belt retraction direction. The retractor of the invention also has a mechanism which is settable to prevent the relatively strong spring from acting on the seat belt so that only the relatively weak spring then biases the seat belt in the belt retraction direction.

2. Prior Art

Seat belt retractors having a relatively strong power spring and a relatively weak comfort spring for biasing a seat belt in a belt retraction direction are known. U.S. Pat. Nos. 4,126,282, 4,310,128, and 4,383,658 illustrate examples of such retractors. Each of these patents discloses a seat belt retractor having a strong power spring and a relatively weak comfort spring acting to retract belt webbing. The strong power spring acts between the retractor frame and a ratchet wheel. The comfort spring acts between the ratchet wheel and the spool of the retractor on which the seat belt is wound. When the seat belt is paid out and fastened around a vehicle occupant, a pawl locks the ratchet wheel so that it cannot rotate in the belt retraction direction. The relatively weak comfort spring then acts to bias the belt in the belt retraction direction. If the occupant moves in his seat, he moves against only the bias of the relatively weak comfort spring.

SUMMARY OF THE INVENTION

The present invention relates to a seat belt retractor having first and second springs which bias the spool of the retractor on which the seat belt is wound in a belt retraction direction. The retractor also includes a mechanism which is actuatable to block the bias of the first spring from acting on the spool so that only the second spring acts to bias the spool in the belt retraction direction. In the disclosed embodiments, the first spring acts between the retractor frame and a ratchet wheel and the second spring acts between the ratchet wheel and the spool of the retractor. A pawl is movable between at least first and second positions. The pawl when in its first position locks the ratchet wheel from rotation in the belt retraction direction. When the pawl locks the ratchet wheel from rotation in the belt retraction direction, only the second spring acts to bias the seat belt in a belt retraction direction. The second spring is a relatively weak comfort spring. The occupant then may withdraw the seat belt for a predetermined distance (a comfort zone) against the force of the relatively weak comfort spring only.

The retractor includes a cam which is rotatable relative to the retractor spool. The cam controls movement of the pawl between its first and second positions. A cam driver is rotatable with the spool. The cam driver carries a deflectable part which engages the cam and rotates the cam in belt withdrawal and belt retraction directions to control the position of the pawl. The cam and pawl have parts which cooperate to block rotation of the cam in the belt retraction direction by the cam driver when the pawl is in its second position. When the cam is blocked from rotation in the belt retraction direction, the deflectable part can deflect and rotate past the cam. Preferably, the cam has an angled slot, and the surfaces defining the slot deflect the deflectable part radially inwardly, and thus the cam driver rotates past the cam. In the preferred embodiment, the deflectable part is a wire dog.

In accordance with one embodiment of the present invention, to increase the comfort zone, i.e., the length of belt which may be withdrawn against the force of the relatively weak comfort spring only, the cam is driven by two relatively rotatable members. A first one of the members is drivingly connected to the spool. The second member, which carries the deflectable part, is rotatable relative to the cam and relative to the first member and is rotated by the first member. The first member is rotatable for up to about one revolution and then rotates the second member into engagement with the cam to drive the cam to disengage the pawl from the ratchet. Thus, the comfort zone is increased by the amount of belt which is withdrawn during rotation of the first member relative to the second member in the belt withdrawal direction.

BRIEF DESCRIPTION OF THE DRAWINGS

Further features of the present invention will become apparent to those skilled in the art to which the present invention relates from reading the following specification with reference to the accompanying drawings, in which:

FIG. 3 is a schematic view of the retractor of FIG. 1 showing the relative position of certain parts;

FIGS. 4 through 9 are views similar to FIG. 3 with parts shown in different positions;

FIG. 10 is an enlarged cross-sectional view of a portion of a seat belt retractor showing a second embodiment of the present invention;

FIG. 11 is a schematic view of the retractor of FIG. 10 showing the relative position of certain parts; and FIG. 12 is a view similar to FIG. 11 with parts shown in different positions.

DESCRIPTION OF PREFERRED EMBODIMENTS

Figure 1:
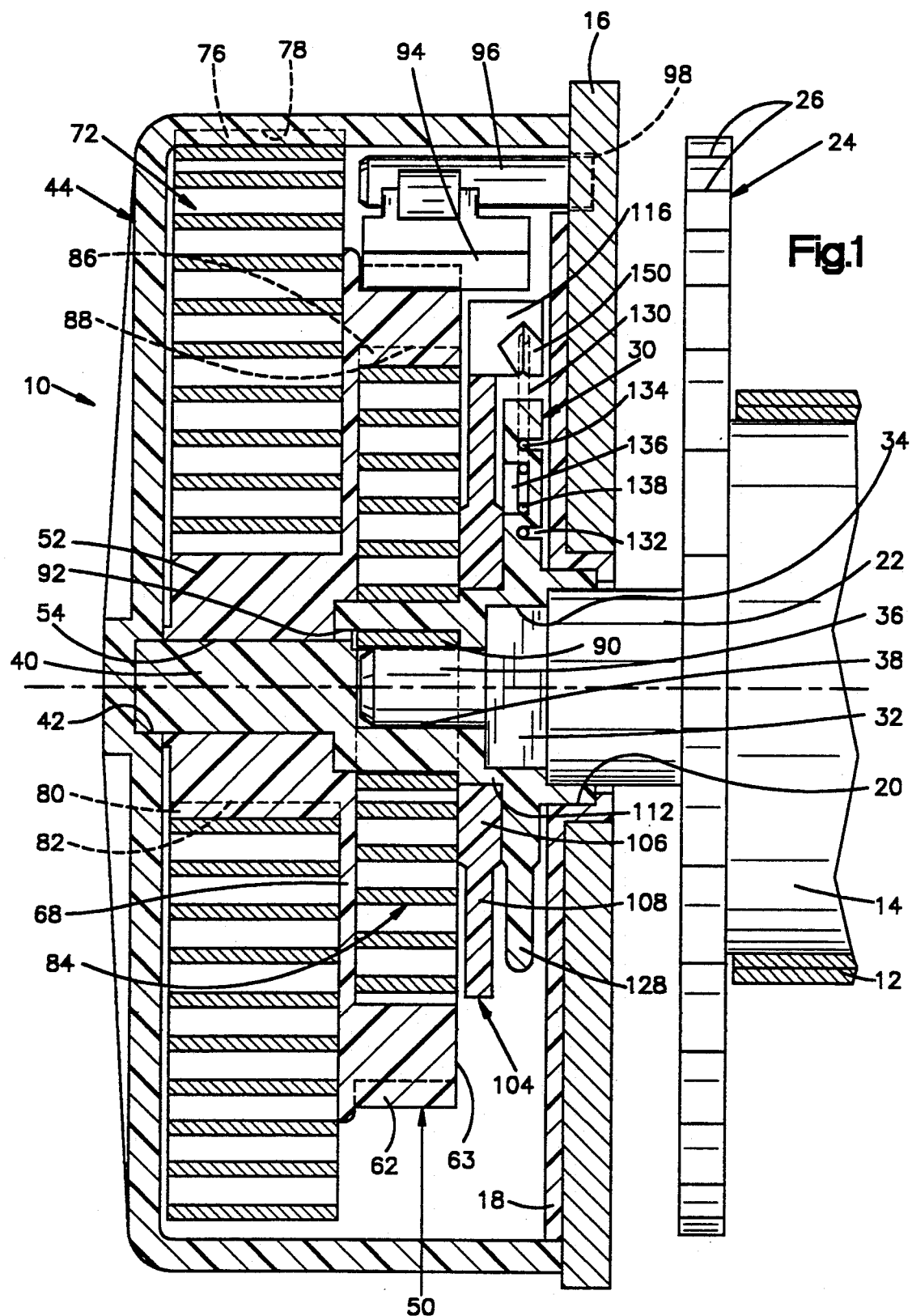
FIG. 1 is an enlarged cross-sectional view of a portion of a seat belt retractor embodying the present invention.

A vehicle seat belt retractor 10 (FIG. 1) has seat belt webbing 12 wound on a spool 14. The spool 14 is mounted for rotation in a retractor frame 16 which is secured to the vehicle. Attached to the frame 16 is a bearing plate 18 which has a central annular bearing surface 20. The bearing surface 20 rotatably supports a cam driver 30, a portion of which supports a shaft 22 that is coaxial and rotatable with the spool 14. Between the frame 16 and the spool 14 is a spool locking ratchet wheel 24 that is fixed to the spool and has a plurality of circumferentially spaced locking teeth 26. The locking teeth 26 on the spool are engageable by a lock bar (not shown) to block rotation of the spool in the belt withdrawal direction in the event of deceleration of the vehicle at a rate above a predetermined rate. Rotation of the spool 14 could also be blocked by withdrawal of belt webbing 12 from the spool at a rate above a predetermined rate.

A portion 32 of the shaft 22 projects from the bearing plate 18 in a direction away from the spool 14 and is flattened on at least two radially opposite segments of its circumferential surface. The flattened shaft portion 32 is received in a bore 34 in the annular, disk-like cam driver 30, so that the spool 14 and the cam driver 30 always rotate with each other. A stud portion 36 of the shaft 22 extends axially beyond the flattened portion 32 and fits in a counterbore 38 in the cam driver 30. The counterbore 38 is formed in a stud 40 that projects axially from the center of the main, disk-like portion of the cam driver 30 in a direction away from the spool 14. The outer circumference of the stud 40 decreases along its length in two steps so that the stud has a first outer diameter nearest the main portion of the cam driver 30, a second smaller diameter part way along the length of the stud, and a third smallest diameter at the outer end of the stud. The outer end of the stud 40 is rotatably received in a central bore 42 in a cup-shaped housing 44. The housing 44 is fixed to the frame 16 in a suitable manner (not shown) so that the housing encloses the shaft 22 and the cam driver 30. Thus, the spool 14, on which the belt webbing 12 is wound, and the cam driver 30, which is fixed to the spool shaft 22, are rotatable together relative to the retractor frame 16 and the housing 44.

An annular ratchet 50 is mounted for rotation relative to the cam driver 30 and the housing 44. The ratchet 50 (FIG. 2) includes an annular main body portion 63 and a smaller diameter hub 52 which is joined to the main body portion by a radially extending wall 68. The hub 52 projects axially from one side of the ratchet 50 and has an axially extending bore 54. The cam driver stud 40 extends through the bore 54 of the ratchet 50 so that the ratchet is mounted for rotation on the smallest diameter portion of the stud 40. A plurality of ratchet teeth 62 are spaced circumferentially about the outer circumference of the annular main body portion 63 of the ratchet 50. Each ratchet tooth includes a radially outwardly extending ramp portion 64 and a radially outwardly extending blocking surface 66. A radially extending surface on the radially extending wall 68 of the ratchet 50 and an axially extending inner circumferential surface 70 of the main body portion 63 define a spring cavity within the main body portion 63.

A relatively strong power coil spring 72 is mounted on the outer circumference of the hub 52 and acts between the housing 44 and the ratchet 50. An outer end 76 of the power spring 72 is received in a slot 78 in the axially extending wall of the housing 44. An inner tab 80 of the power spring 72 is received in a slot 82 in the hub 52 of the ratchet 50. The power spring 72 is wound in a direction such that it biases the ratchet 50 to rotate relative to the housing 44 in the belt retraction direction 74 (FIG. 3).

A relatively weak comfort coil spring 84 (FIG. 2) is disposed in the spring cavity defined by the surfaces 68 and 70 within the main body portion 63 of the ratchet 50. The comfort spring 84 has an outer end 86 received in a slot 88 in the main body portion 63 of the ratchet 50, and an inner end 90 (FIG. 1) received in a slot 92 in the stud 40 of the cam driver 30. The comfort spring 84 acts between the ratchet 50 and the cam driver 30, and acts to bias the cam driver 30 in the belt retraction direction 74 relative to the ratchet 50. Accordingly, the power spring 72 and the comfort spring 84 act in series to bias the cam driver 30 and thus the spool 14 to rotate in the belt retraction direction 74.

A pivotally mounted pawl 94 is operative selectively to block rotation of the ratchet 50 in the belt retraction direction 74. A stem portion 96 of the pawl 94 is fitted in a bore 98 in the retractor frame 16. A leaf spring 100 (FIG. 3) biases the pawl 94 radially inwardly toward engagement with the teeth 62 of the ratchet 50. When the pawl 94 is biased inwardly by the spring 100, as seen in FIG. 6, an end 102 of the pawl 94 away from the stem portion 96 can engage a blocking surface 66 on the ratchet 50 to block rotation of the ratchet 50 in the belt retraction direction 74. When the ratchet 50 is blocked from rotation in the belt retraction direction 74, the relatively strong power spring 72 is rendered inoperative and does not bias the spool 14 in the belt retraction direction 74. Thus, when the pawl 94 blocks rotation of the ratchet 50 in the belt retraction direction, only the relatively weak comfort spring 84 acts to bias the spool 14 in the belt retraction direction 74.

A cam 104 is operable to move the pawl 94 selectively out of engagement with the ratchet 50. The cam 104 includes a hub portion 106 and a disk portion 108 projecting radially from the hub portion 106. The cam 104 is supported on the largest diameter portion 112 of the cam driver stud 40 for rotation relative to the cam driver 30. The cam 104 is thus rotatable relative to the spool 14. A cam projection 116 projects radially from the cam disk portion 108 and axially in a direction to the right as viewed in FIG. 1. The radially outer surface of the cam projection 116 has a first cam surface 118 (FIG. 6), a notch 120, and a second cam surface 122. The notch 120 is disposed between the cam surfaces 118 and 122 on the circumference of the cam 104. The notch 120 is also engageable with the end 102 of the pawl 94 to hold the pawl out of engagement with the ratchet 50 (FIG. 4). When the pawl 94 is engaged with the notch 120, the ratchet 50 is rotatable in the belt retraction direction 74, and the power spring 72 is operable to bias the spool 14 in the belt retraction direction 74.

Figure 2:
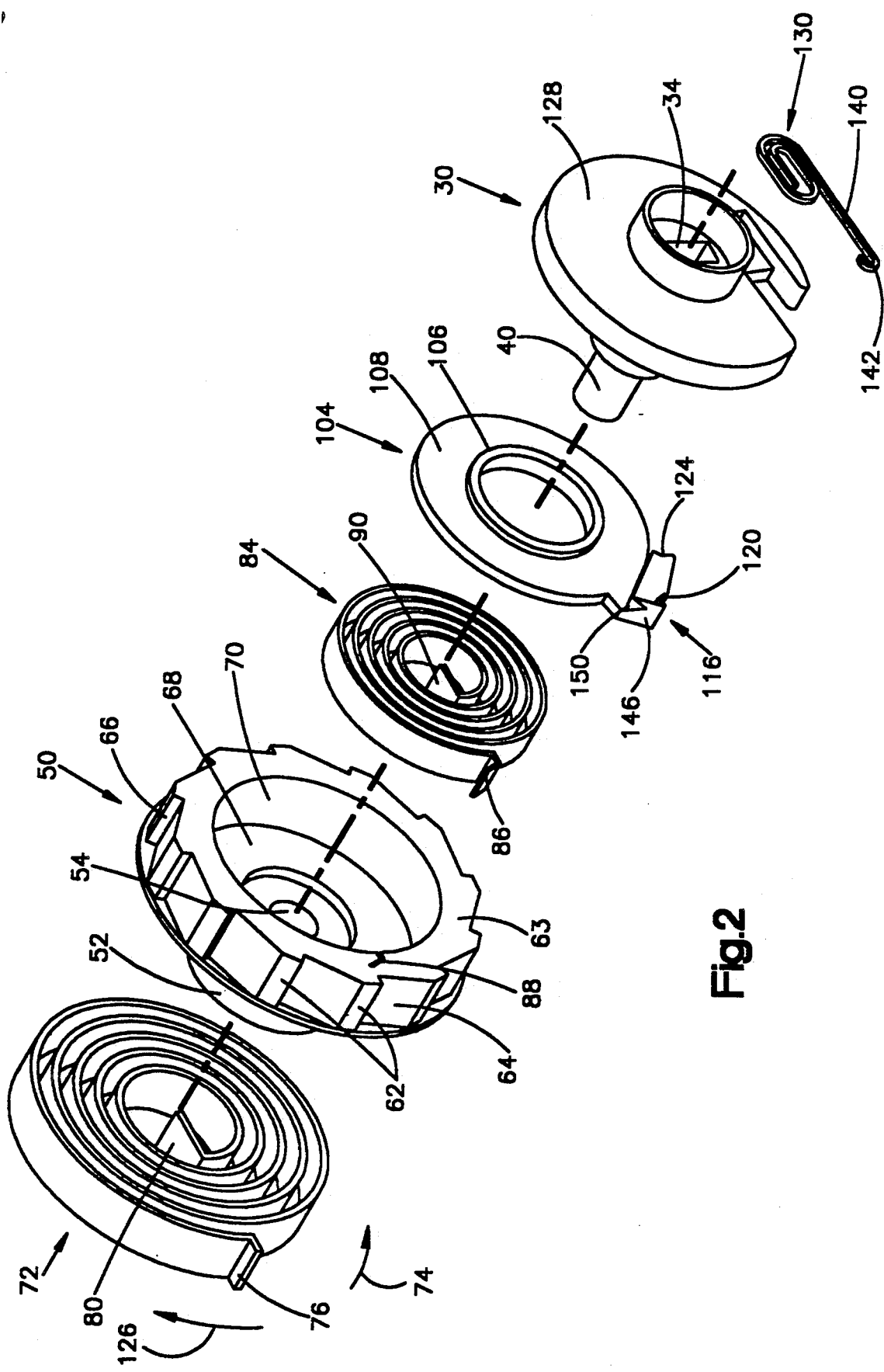
FIG. 2 is an exploded perspective view of certain parts of the retractor of FIG. 1.

A groove 150 is formed in the radially inner surface of the cam projection 116. The groove 150 is V-shaped, as best seen in FIG. 2, and is angled radially inwardly along its length. The groove 150 is also tapered, having a varying cross-sectional area along its length. Thus, at a nose end 124 of the cam projection 116, the groove 150 is narrowest and the bottom of its V-shape is closest to the center of the cam 104. At the circumferentially opposite end 146 of the cam projection 116, the groove is widest and the bottom of its V-shape is farthest from the center of the cam 104.

The cam 104 is rotated into and out of engagement with the pawl 94 by the cam driver 30. The cam driver 30 has a disk portion 128 with opposed, radially extending faces. The disk portion 128 carries a deflectable member 130. In the preferred embodiment, the deflectable member 130 is a wire dog. A U-shaped groove 132 is formed in one radially extending face of the disk portion 128 and receives an outer loop portion 134 of the wire dog 130. A recess 136 in the axially opposite face of the disk portion 128 receives an inner loop portion 138 of the wire dog 130. The loop portions 134 and 138 are resiliently deflectable out of a common plane and thus grip opposite sides of the disk portion 128 to retain the wire dog 130 in position relative to the disk portion 128. The wire dog 130 has a deflectable portion 140 with a rounded end portion 142 that projects radially outwardly of the radially outer circumference 144 (FIG. 3) of the cam 104.

Because the cam projection 116 projects axially from the cam disk portion 108, the wire dog 130 and the cam projection 116 are located in the same radially extending plane (see FIG. 1). Thus, as the cam driver 30 rotates with the belt spool 14, the deflectable portion 140 of the wire dog 130 can engage the cam projection 116 to rotate the cam 104. If the cam driver 30 is rotated in the belt withdrawal direction 126 relative to the cam 104, the end portion 142 (FIG. 4) of the wire dog 130 engages the nose end 124 of the cam projection 116. The cam 104 then rotates with the cam driver 30.

If the cam driver 30 rotates in the belt retraction direction 74 relative to the cam 104, the wire dog 130 engages the end 146 of the cam projection 116. The wire dog end portion 142 enters the groove 150 from the end 146, and the wire dog is deflected radially inwardly by an inner groove surface 152. As the wire dog 130 is deflected radially inwardly, enough friction eventually develops between the wire dog end portion 142 and the groove surface 152 so that the wire dog 130 begins to pull the cam 104 in the belt retraction direction 74.

When the belt webbing 12 is fully wound on the retractor spool 14, the parts of the retractor 10 are in the position illustrated in FIG. 3. The pawl 94 is held out of engagement with the ratchet 50 by the cam 104, and thus the relatively strong power spring 72 and the relatively weak comfort spring 84 are both biasing the spool 14 in the belt retraction direction 74. The cam driver 30 with the wire dog 130 may be in any given angular position relative to the cam 104, depending on where the cam driver came to rest when the belt webbing became fully wound on the spool 14 and retraction stopped. In FIG. 3, the wire dog 130 is shown spaced angularly from the cam projection 116.

When the vehicle occupant withdraws belt webbing from the spool 14 to buckle the safety belt, the retractor spool 14 rotates in the belt withdrawal direction 126. The cam driver 30 and the wire dog 130, which are rotationally fixed to the spool 14, also rotate in the belt withdrawal direction 126. The wire dog 130 eventually engages the nose 124 of the cam projection 116, as viewed in FIG. 4. As the spool 14 and the cam driver 30 continue to rotate, the wire dog 130 rotates the cam 104. The notch 120 in the cam 104 moves away from the end of the pawl 94. The leaf spring 100 moves the pawl 94 inwardly along the second cam surface 122 and eventually the pawl 94 drops off the cam projection 116 onto the ratchet 50.

During this belt withdrawal, the ratchet 50 is also rotating. As belt withdrawal continues, the pawl 94 rides along the exterior of the rotating ratchet 50 from one tooth 62 to the next. The cam driver 30, the wire dog 130, and the cam 104 continue to rotate until the vehicle occupant buckles the safety belt. At that point, the parts may, for example, be in the position shown in FIG. 5.

After the belt is buckled, the belt webbing 12 is released by the vehicle occupant. The power spring 72 and the comfort spring 84 both act to rotate the ratchet 50, the cam driver 30, and the spool 14 in the belt retraction direction 74. The ratchet 50 can only rotate in the belt retraction direction 74 by a small amount, that is, until the end surface 102 of the pawl 94 engages a blocking surface 66 on the first available ratchet tooth 62, as shown in FIG. 6. The ratchet 50 is then blocked from further rotation in the belt retraction direction 74. The power spring 72 is then inoperable to bias the spool 14 in the belt retraction direction 74 and the force of the power spring 72 is no longer felt by the vehicle occupant through the belt webbing 12. Only the force of the comfort spring 84 is felt by the vehicle occupant through the belt webbing 12. Thus, the retractor 10 is in a comfort setting. When the retractor 10 is in the comfort setting, the vehicle occupant is able to move forward in the seat, withdrawing belt webbing 12 from the spool 14 against only the force of the comfort spring 84.

When the retractor 10 is in the comfort setting and belt webbing 12 is withdrawn, the cam driver 30 and the wire dog 130 rotate in the belt withdrawal direction 126. If enough belt webbing 12 is withdrawn, the end portion 142 of the wire dog 130 eventually meets the nose 124 of the cam projection 116 and rotates the cam 104 in the belt withdrawal direction 126 until the cam projection 116 engages the pawl 94. If sufficient belt withdrawal continues, the cam 104 continues to rotate, and the pawl 94 is cammed outwardly off the ratchet 50 by the first cam surface 118. The ratchet 50 is then able to rotate in the belt retraction direction 74 under the influence of the power spring 72. Accordingly, the comfort setting is disengaged if the vehicle occupant leans forward far enough after comfort is set. The amount of belt webbing which is withdrawn before the comfort setting is disengaged is the comfort zone.

When the retractor is in the comfort setting and the vehicle occupant unbuckles the belt, the comfort spring 84 immediately acts to rotate the cam driver 30 and the spool 14 to retract belt webbing. The wire dog 130 rotates in the belt retraction direction 74 until the end portion 142 of the wire dog 130 engages the cam projection 116. The end portion 142 then enters the groove 150 of the cam projection 116. This is the position of the parts as viewed in FIG. 7. The wire dog then rotates the cam 104 in the belt retraction direction 74. As more belt webbing is retracted by the comfort spring 84, the rotating wire dog 130 rotates the cam 104 until the cam 104 engages the pawl 94. The second cam surface 122 (FIG. 8) cams the pawl 94 outwardly off the ratchet 50 until the end of the pawl 94 drops into the notch 120 on the cam 104. The ratchet 50 is then free to rotate and the power spring 72 can again act in series with the comfort spring 84 to bias the spool 14 in the belt retraction direction. The cam 104 is blocked from further rotation in the belt retraction direction. This is the position of the parts as viewed in FIG. 8.

Although the cam 104 cannot rotate further in the belt retraction direction, the cam driver 30 and the wire dog 130 are able to continue rotating in the belt retraction direction because the wire dog portion 140 deflects radially inwardly and moves through the groove 150, as viewed in FIG. 9, allowing the wire dog to be drawn completely through the groove 150. Each time the wire dog 130 rotates to the position of the cam projection 116, the deflectable portion 140 deflects inwardly and passes through the groove 150 in the cam projection 116. The cam driver 30 and the wire dog 130 continue rotating in the belt retraction direction until all the belt webbing 12 is wound on the spool 14. The cam 104 remains in position holding the pawl 94 out of engagement with the ratchet 50. The parts of the retractor 10 are then again in the starting position, as illustrated in FIG. 3.

In the embodiment shown in FIGS. 1-9, when the seat belt is buckled about the vehicle occupant, the occupant can move around in his seat against only the bias of the relatively weak comfort spring 84. This movement against only the bias of the relatively weak comfort spring 84 stops when the pawl 94 is moved away from the ratchet by the cam 116. Thus, the amount of movement of the occupant against the bias of the relatively weak spring 84 (the comfort zone) is limited by the amount of belt webbing which can be withdrawn prior to rotation of the cam 104 to effect movement of the pawl 94 away from the ratchet 50.

In a second embodiment of the invention, an increased comfort zone is provided with almost one extra revolution of the belt spool 14 (as compared to the embodiment of FIGS. 1–9) being possible in the belt withdrawal direction while the retractor is in the comfort setting. The second embodiment is illustrated in FIGS. 10–12, in which parts that are the same as in the embodiment of FIGS. 1–9 are given the same reference numerals as in FIGS. 1–9.

In the embodiment of FIGS. 10–12, a cam driver 200 is mounted on and rotatable relative to a part 204 which incorporates the stud 40 of the embodiment of FIGS. 1–9. The part 204 is connected to and rotates with the spool 14. The shaft 22 of the spool 14 is received in a bore 206 in a hub portion 202 of the part 204. The part 204 also has an arm 208 that extends radially outwardly between the cam driver 200 and the frame 16. A pin 210 extends axially from the cam driver 200 into the path of rotation of the arm 208. The arrangement of the arm 208 and the pin 210 permits the arm 208 to engage the pin 210 to rotate the cam driver 200 and also permits relative rotation of the cam driver 200 and the part 204, up to about one revolution of the spool 14.

When the vehicle occupant is withdrawing belt webbing 12 to buckle the seat belt, the part 204 rotates in the belt withdrawal direction 126. The arm 208 engages the pin 210 on the cam driver 200, thus rotating the cam driver 200. When the cam driver 200 rotates far enough, the wire dog 130 on the cam driver 200 contacts the cam projection 116 and rotates the cam 104. The arm 208, the pin 210, the wire dog 130, and the cam 104 continue to rotate in the belt withdrawal direction 126 until the belt is buckled. The parts are then in a relative position such as is shown in FIG. 11.

The occupant then releases the belt. The power spring 72 rotates the ratchet 50 a small amount in the belt retraction direction 74 until the ratchet 50 is blocked from rotation by the pawl 94. The retractor 10 is thus in the comfort setting, in which only the comfort spring 84 is acting against withdrawal of the belt webbing. During the foregoing rotation of the ratchet 50, the part 204 also rotates in the belt retraction direction 74 a small amount relative to the pin 210 and the cam driver 200.

When the occupant leans forward while the retractor is in its comfort setting, belt webbing 12 is withdrawn, and the spool 14 and the part 204 rotate in the belt withdrawal direction 126. The arm 208 on the part 204 moves a small amount to contact the pin 210 and rotate the cam driver 200. Thus, the occupant can lean forward and withdraw up to about one full turn of webbing 12 from the spool 14 against only the force of the comfort spring 84, just as in the embodiment of FIGS. 1–9.

Unlike the embodiment of FIGS. 1–9, however, the embodiment of FIGS. 10–12 also permits additional webbing to be withdrawn when the retractor is in its comfort setting. Specifically, after the spool 14 has been rotated through about one full revolution when the retractor is in its comfort setting, the pawl 94 is cammed outwardly off the ratchet 50, just as in the embodiment of FIGS. 1–9. The ratchet 50 is then free to rotate in the belt retraction direction and the power spring 72 applies a biasing force to the spool 14 and the webbing 12. If the vehicle occupant continues to lean forward and withdraws still more webbing from the retractor 10, the pawl 94 moves past the notch 120 and moves down the second cam surface 122 onto the ratchet 50. When the vehicle occupant then sits back in his seat, the part 204 and the arm 208 rotate in the belt retraction direction 74, with the spool 14 and relative to the pin 210 and the cam driver 200. After about one full revolution, the arm 208 again contacts the pin 210 and causes the cam driver 200 to rotate in the belt retraction direction 74 with the spool 14 until the belt webbing 12 is taut across the vehicle occupant.

Thereafter, any time the vehicle occupant leans forward, the part 204 and the arm 208 rotate in the belt withdrawal direction 126 relative to the pin 210 and to the cam driver 200 through approximately one full revolution before again contacting and moving the pin 210 and the cam driver 200. This is in contrast to the embodiment of FIGS. 1–9, in which the cam driver 130 rotates immediately when the occupant leans forward while in the comfort setting. If the occupant withdraws more webbing, the cam driver 200 rotates further until the wire dog 130 engages the end 146 of the cam projection 116 to rotate the cam 104 to effect movement of the pawl 94 away from the ratchet 50. Thus, in the embodiment of FIGS. 10–12, the vehicle occupant can lean forward and withdraw up to almost one extra revolution of belt webbing 12 from the spool 14 (compared to the embodiment of FIGS. 1–9), against only the force of the comfort spring 84, before the cam driver 200 begins to rotate the cam 104 to effect movement of the pawl 94 away from the ratchet 50.

From the above description of preferred embodiments of the invention, those skilled in the art will perceive improvements, changes and modifications. Such improvements, changes and modifications within the skill of the art are intended to be covered by the appended claims.

I claim:

1. A seat belt retractor comprising:
a frame;
a spool on which seat belt webbing is wound and which is rotatable in said frame in belt withdrawal and belt retraction directions;
a ratchet rotatable relative to said spool;
first and second springs biasing said spool in the belt retraction direction, said first spring acting between said ratchet and said frame, said second spring acting between said ratchet and said spool;
a pawl having a first position blocking rotation of said ratchet in the belt retraction direction and a second position in which said pawl does not block rotation of said ratchet in the belt retraction direction;
means biasing said pawl toward its first position;
a cam rotatable relative to said spool and said pawl, said cam having a surface portion for moving said pawl from its first position to its second position upon rotation of said cam relative to said pawl; and
a cam driver rotatable with said spool and engageable with said cam to rotate said cam relative to said pawl to effect movement of said pawl from its first position to its second position;

said cam and pawl cooperating to block rotation of said cam in the belt retraction direction by said cam driver when said pawl is in said second position;

said cam driver including a deflectable part which engages said cam when said cam is blocked from rotation in the belt retraction direction and said cam driver is rotating in the belt retraction direction, which deflectable part deflects and rotates past said cam in the belt retraction direction.

2. A seat belt retractor as defined in claim 1 wherein said cam driver has a hub portion coaxial with said spool, a disk portion projecting radially from said hub portion, and said deflectable part comprises a wire dog carried by and projecting from said disk portion.

3. A seat belt retractor as defined in claim 2 wherein said cam is supported on said hub portion of said cam driver, said cam including a cam portion projecting into the path of rotation of said wire dog, said cam portion having surfaces that define an angled slot and that engage an end of said wire dog and deflect said wire dog radially inwardly to enable said wire dog to pass through the slot in the belt retraction direction when said cam is blocked from rotation in the belt retraction direction.

4. A seat belt retractor as defined in claim 3 wherein said cam driver hub portion is connected to said spool for rotation with said spool.

5. A seat belt retractor comprising:
a spool on which seat belt webbing is wound, said spool being rotatable in belt withdrawal and belt retraction directions;
first and second springs for biasing said spool in the belt retraction direction;
means for selectively blocking the bias of said first spring from acting on the spool, said means comprising a rotatable ratchet associated with said first spring and a pawl movable between at least first and second positions, said pawl in said first position engaging said ratchet to block rotation of the ratchet in the belt retraction direction to thereby block the bias of said first spring from acting on the spool;
a cam rotatable relative to said spool for controlling the movement of said pawl between its first and second positions; and
a cam driver rotatable with said spool, said cam driver including a deflectable part which engages said cam and rotates said cam to control the position of said pawl.

6. A seat belt retractor as defined in claim 5 wherein said deflectable part comprises a wire dog, said wire dog having a rounded end which engages a first portion of said cam to rotate said cam in the belt withdrawal direction.

7. A seat belt retractor as defined in claim 6 wherein said end of said wire dog engages a second portion of said cam to rotate said cam in the belt retraction direction, said cam and said pawl cooperating to block rotation of said cam in the belt retraction direction by said cam driver, said cam including surfaces defining an angled slot along said cam which surfaces deflect said wire dog radially inward enabling said wire dog to pass through the slot in the belt retraction direction when said cam is blocked from rotation in the belt retraction direction.

8. A seat belt retractor as defined in claim 6 wherein said cam driver has a hub portion connected to said spool for rotation with said spool, and said cam is supported on said hub portion for rotation relative to said hub portion.

9. A seat belt retractor as defined in claim 6 wherein said cam driver is rotatable relative to said spool, and the retractor further includes a member connected to said spool for rotation with said spool, said member being rotatable relative to said cam driver and having a portion engageable with said cam driver to rotate said cam driver.

10. A seat belt retractor comprising:
a spool on which seat belt webbing is wound, said spool being rotatable in belt withdrawal and belt retraction directions;
first and second spring means for biasing said spool in the belt retraction direction;
means actuatable for selectively blocking the bias of said first spring means from acting on said spool whereby only said second spring means biases the spool in the belt retraction direction when said means is actuated; and
means for deactuating said actuatable means after more than one revolution of said spool to allow said first and second spring means to bias said spool in the belt retraction direction against withdrawal of belt webbing only after more than one revolution of said spool.

11. A seat belt retractor as defined in claim 10 wherein said means actuatable to selectively block the bias of said first spring means comprises a ratchet rotatable in the belt withdrawal direction, said first spring means acting between said ratchet and said frame, said second spring means acting between said ratchet and said spool, and a pawl carried by said frame and movable relative thereto to engage said ratchet and lock said ratchet from rotation in the belt withdrawal direction.

12. A seat belt retractor as defined in claim 11 wherein said means for deactuating said actuatable means comprises a cam for moving said pawl away from said ratchet to enable said ratchet to rotate in the belt withdrawal direction, and means rotatable to engage said cam and after engaging said cam moving said cam to move said pawl away from said ratchet.

13. A seat belt retractor as defined in claim 12 wherein said means rotatable to engage said cam comprises a first member drivingly connected with said spool and a second member for driving said cam and rotatable relative to said first member and rotatable relative to said cam, said first member being rotatable for about one revolution and thereafter rotating said second member into engagement with said cam, and said second member after engaging said cam driving said cam to move said pawl away from said ratchet.

14. A seat belt retractor comprising:
a frame;
a spool on which seat belt webbing is wound and which is rotatable in said frame in belt withdrawal and belt retraction directions;
a ratchet rotatable relative to said spool;
first and second springs biasing said spool in the belt retraction direction, said first spring acting between said ratchet and said frame, said second spring acting between said ratchet and said spool;
a pawl having a first position blocking rotation of said ratchet in the belt retraction direction and a second position in which said pawl does not block rotation of said ratchet in the belt retraction direction;
means biasing said pawl toward its first position;

a cam rotatable relative to said spool and said pawl, said cam having a surface portion for moving said pawl from its first position to its second position upon rotation of said cam relative to said pawl; and a cam driver rotatable with said spool and engageable with said cam to rotate said cam relative to said pawl to effect movement of said pawl from its first position to its second position;

said cam and pawl cooperating to block rotation of said cam in the belt retraction direction by said cam driver when said pawl is in said second position;

said cam driver also being rotatable relative to said spool, and the retractor further including a member connected to said spool for rotation with said spool, said member being rotatable relative to said cam driver and having a portion engageable with said cam driver to rotate said cam driver.

* * * * *